Aug. 28, 1962  H. L. KITSELMAN  3,051,202
MACHINE FOR MAKING HELIXES
Filed June 6, 1958  2 Sheets-Sheet 2
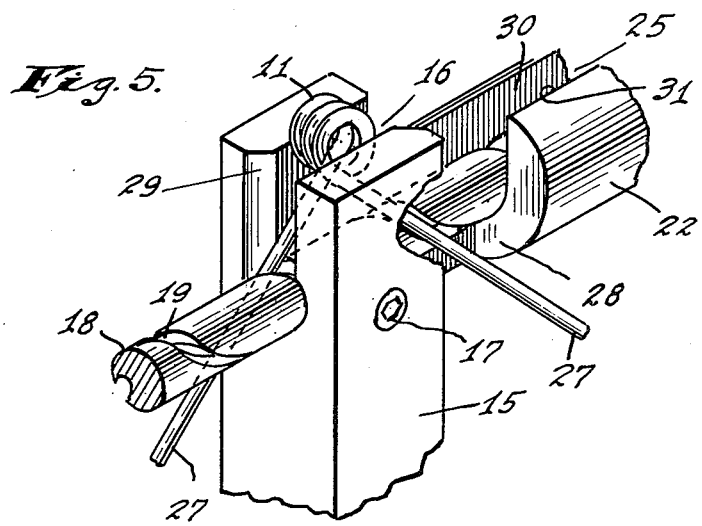
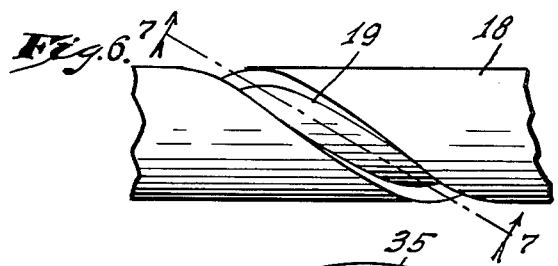
INVENTOR.
HARRY L. KITSELMAN
BY
ATTORNEYS.

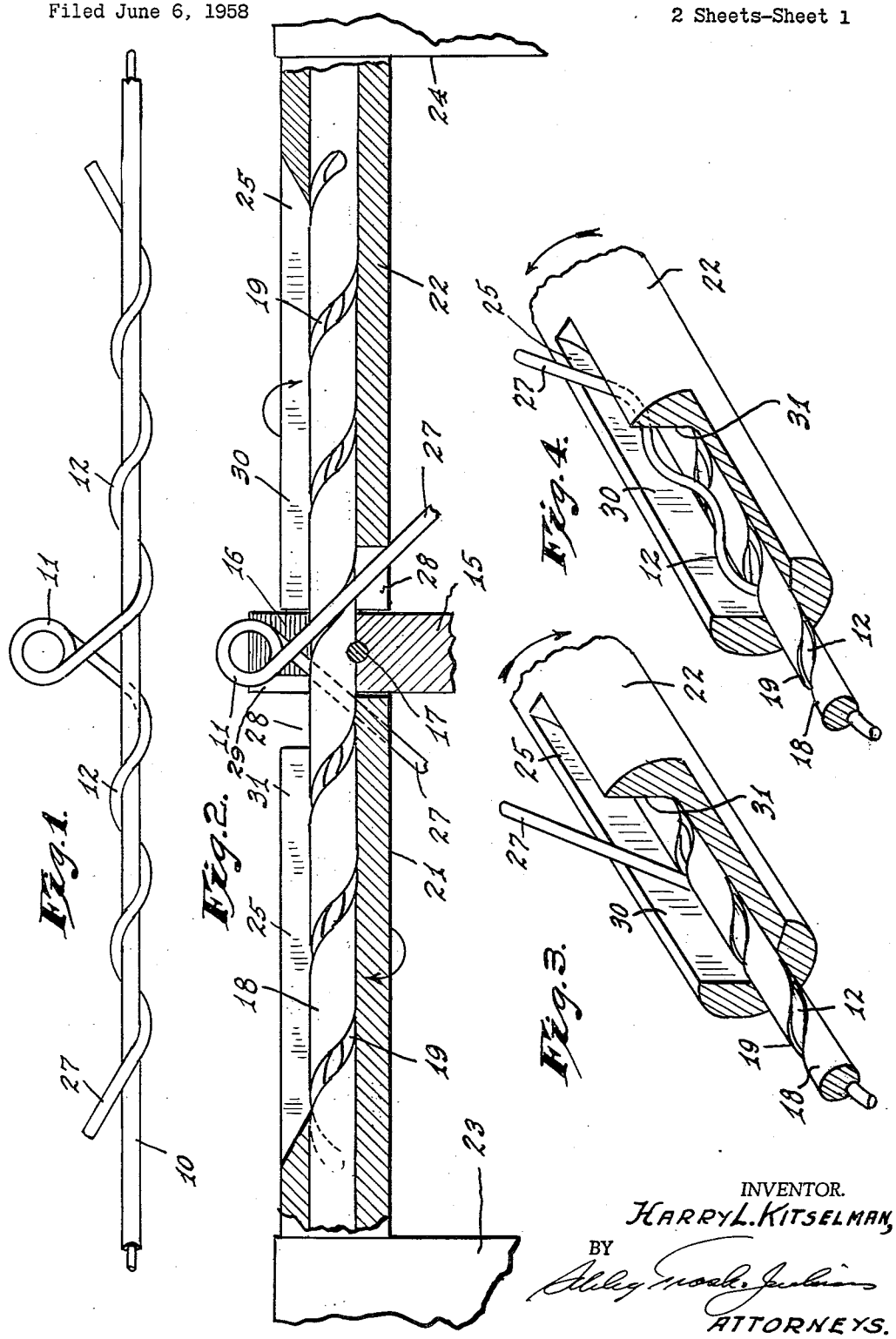

United States Patent Office 3,051,202
Patented Aug. 28, 1962

3,051,202
MACHINE FOR MAKING HELIXES
Harry L. Kitselman, Muncie, Ind., assignor to Indiana Steel & Wire Company, Inc., Muncie, Ind., a corporation of Indiana
Filed June 6, 1958, Ser. No. 740,451
9 Claims. (Cl. 140—90)

This invention relates to the formation of long-pitch helixes from relatively hard, resilient wire. Such helixes frequently constitute or are embodied in splints, reinforcements, and supports adapted for application to line conductors and cables.

It is an object of the invention to provide apparatus by which such long-pitch helixes can be simply and economically formed. Another object of the invention is to provide apparatus adapted for the formation of long-pitch helixes in portions only of a length of wire. Still another object is to provide apparatus which can readily be adapted to form helixes of non-circular cross-section, of progressively varying pitch, or of either hand.

In carrying out my invention I employ an elongated quill or mandrel of circular cross-section having an outer diameter substantially equal to the outer diameter of the helix which is to be formed, and in such quill I cut a helical groove having a base diameter and pitch coordinated respectively with the internal diameter and pitch of the desired helix. Such quill is surrounded by a coaxial sleeve having a longitudinally extending slot in the base of which the quill is received. The quill and sleeve are supported for relative rotation about the quill-axis, the quill preferably being stationary and the sleeve rotatable.

In making a helix, the wire from which the helix is to be formed is laid in the helical groove of the quill adjacent the end of the sleeve in such a position that as the quill and sleeve rotate relatively in the proper direction one wall of the slot therein will engage the wire and wrap it into the helical groove of the quill. Rotation is stopped while an end of the wire still remains straight and projects obliquely outward, into or through the slot in the sleeve. Relative rotation in the reverse direction is then effected, and the formed helix is unwound from the quill passing outwardly through the slot in the sleeve.

Other objects and features of the invention will become apparent from the following more detailed description and from the drawings, in which:

FIG. 1 is an elevational view illustrating a device adapted for formation by apparatus embodying my invention;

FIG. 2 is an axial section through the helix-forming element of the machine;

FIG. 3 is a fragmental isometric view illustrating a helix in the process of formation;

FIG. 4 is a view similar to FIG. 3 illustrating a stage in the unwinding of the helix from the quill;

FIG. 5 is a fragmental isometric view illustrating a portion of the mechanism shown in FIG. 2.

FIG. 6 is a fragmental elevation of a quill; and

FIG. 7 is a section on the line 7—7 of FIG. 6.

The device shown in FIG. 1 is of a type in common use as a support and reinforcement for a line conductor 10. The device is formed of a length of wire wound into a short, close-wound coil at its middle to provide an eye 11 for attachment to any convenient support. The end portions of the wire are formed into oppositely extending aligned helixes 12 which have an internal diameter such that they will grip the line conductor 10 and a pitch long enough to permit the helix to be readily wrapped around the conductor when disposed beside it.

Apparatus for forming the helical end portions 12 of the device shown in FIG. 1 is illustrated in FIG. 2. Such apparatus comprises a stationary post 15 provided at its end with a slot 16 adapted to receive the eye 11 with the axis of such eye extending generally perpendicularly to the parallel, opposed walls of the slot. At the base of the slot 16 there is secured, as by a pin 17, a quill 18 in the form of a metal rod of circular cross-section extending in both directions from the post 15. The quill 18 preferably has a diameter substantially equal to the outer diameter of the helical portions 12 and is provided with a helical groove 19 corresponding in base diameter and pitch to the internal diameter and pitch of the helical portions 12.

The projecting end portions of the quill 18 are received respectively in sleeves 21 and 22 mounted in fixed axial position in suitable supports 23 and 24 for rotation about the axis of the quill. Each of the sleeves has a slot 25 extending longitudinally from the sleeve-end nearest the post 15 for a distance at least approximately equal to the length of the helix to be formed. Each slot 25 receives the quill at its base and has a width at least equal to the outer diameter of the helix to be formed.

In forming the specific device illustrated in FIG. 1, a length of wire is wound at its center to produce the eye 11, leaving the end portions of the wire extending from the eye as substantially straight legs 27 (FIG. 2) diverging from each other at an angle such that they are adapted to be received in the helical groove 19 on opposite sides of the quill 18. The wire so formed is then put in place in the machine with the eye 11 received in the slot 16 and the legs 27 received in the groove 19 of the quill, as shown in FIG. 2. The sleeves 21 and 22 extend into such proximity to the post 15 that the wire-legs 27 project obliquely through the ends of the slots 25. To facilitate such positioning of the wire, the end of each of the sleeves 22 and 23 may be provided with a notch 28 best shown in FIG. 5 and longitudinal edges of the groove 16 may be beveled as indicated at 29. The particular helixes 12 shown in FIG. 1 are right-hand helixes; and to form them, each of the sleeves 21 and 22 will therefore rotate in a clockwise direction looking outward from the central post 15. In such rotation, each projecting wire-leg 27 will be engaged by the counterclockwise wall 30 of the slot and wrapped around the quill 18 into the groove 19. The notch 28 in each sleeve 22 is located at the clockwise side of the slot 25 and shortens the clockwise wall 31 of such slot. The length of the notch 28 axially of the sleeve is desirably no greater than that necessary to facilitate positioning of the wire at the beginning of the winding operation.

With the wire positioned as shown in FIGS. 2 and 5, the sleeves 21 and 22 are rotated, each in the clockwise direction as viewed looking outwardly from the post 15. After approximately one-half revolution, each projecting wire-leg 27 is engaged by a slot-wall 30, and continued rotation of each sleeve wraps the wire about the quill into a helix in the manner illustrated in FIG. 3. Rotation of the sleeves is terminated while an end portion of each wire-leg 27 remains straight and projecting obliquely outwardly from the quill in the slot 25. When the sleeves 21 and 22 are rotated in the reverse direction (FIG. 4) such projecting ends of the legs 27 are engaged by the slot walls 31, and the formed helixes are unwound from the quill 18, passing radially outwardly through the slot 25. When both helically formed end portions 12 are completely unwound, the completed device is withdrawn from the machine, the eye 11 passing upwardly through the end of the slot 16.

It will be understood that my invention is not limited to machines adapted to produce the particular support shown in FIG. 1. By laying any substantially straight length of wire in the quill-groove 19 so that the ends of the wire project in opposite directions beyond the quill, by holding the outer of the projecting wire-ends stationary while the other is positioned to be engaged by a side wall of the slot 25 in the quill-surrounding sleeve, a helix corresponding in diameter and pitch to the diameter and pitch of the groove 19 will be formed; and if the helix-forming operation is terminated while a straight end of the wire still remains in the sleeve-slot, reverse rotation of the sleeve will unwind the completed helix from the quill.

Although I have referred to the groove 19 as corresponding in pitch and base diameter to the pitch and internal diameter of the helix, some allowance must be made for the elastic nature of the wire, which will cause it to spring back slightly toward its original straight condition when relieved of winding effort. Accordingly, the base diameter of the groove 19 should be somewhat less than the desired internal diameter of the finished helix and the pitch of the groove 19 should be somewhat less than the desired pitch of the finished helix. In some cases, a slight permanent distortion, tending to reduce the diameter of the helix, may occur as an incident to the unwinding operation; and when accurate control of helix diameter is required, any such distortion will have to be taken into account in determining the base diameter of the quill-groove. Since the bending of the wire incident to winding of the helix forces the wire into the base of the groove 19, the quill 18 may have a diameter and the slot 25 a width greater than the outer diameter of the finished helix.

It is possible with my invention to form helixes of non-circular cross-section. An example of such a helix is one adapted to grip a line containing a pair of parallel wires and a common insulating sheath. To produce a helix adapted to conform to and grip such a line, the base of the groove 19 may be provided at appropriate intervals with flats 35 as shown in FIG. 7. Such flats are conveniently formed after the groove 19 is cut, by grinding the base of the groove to remove the metal lying below the dotted line of FIG. 7, which dotted line indicates the original conformation of the groove-bottom. Because of the spring-back referred to above, the interval between the flats 35, measured axially of the quill, should be somewhat more than one-half the pitch of the groove 19 or slightly more than 180° measured angularly about the axis of the quill.

It may further be noted that it is unnecessary for the groove 19 to have a uniform pitch throughout its length or for the groove 19 on one side of the post 15 to be in phase with, or of the same pitch as, the groove on the other side. Neither is it necessary, when two helixes are to be simultaneously formed, that both helixes be of the same hand; for, if desired, I may employ a quill having helical grooves of opposite hand on opposite sides of the post 15 or its equivalent, in which event both of the winding sleeves would rotate in the same direction about the quill-axis in forming the two helixes. Again, the invention is not limited to an arrangement in which a single helix is formed by rotation of each of the slotted sleeves; for the quill may be provided with more than one helical groove.

Where, as in making the device shown, two simultaneously formed helixes have the same number of turns, it is convenient to drive the sleeves 21 and 22 at the same speed from a common power-source. In such an arrangement it will of course be advisable that the sleeves be so phased relative to each other that both slots 25 come simultaneously into position to receive the wire-legs 27.

As will be apparent from the above, my invention is extremely flexible in its capability of adaptation for the formation of helixes of circular or non-circular cross-section, of uniform or nonuniform pitch, and of either hand. It may be noted that separation of a helix from the quill by the unwinding operation which characterizes the method of my invention is entirely different from a separation effected by "unscrewing" the helix from the quill. In my method, the progressively diminishing helix portion remaining on the quill stays stationary with respect to the quill, whereas in the latter method the entire helix rotates as a unit about its axis relative to the quill. As a result, helixes of graduated pitch or of non-circular cross-section cannot be removed from the quill by an unscrewing operation; and the same is true of a unitary device embodying helixes of opposite hand formed on a unitary quill.

I claim as my invention:

1. Apparatus for forming a long-pitch helix from a length of resilient wire, comprising relatively rotatable, coaxial members, one of said members being an elongated quill having an external helical groove substantially corresponding in base diameter to the internal diameter of the helix to be formed and in pitch to the pitch of such helix, the other of said members being a sleeve surrounding said quill and rotatable about the axis thereof, said sleeve being provided with a slot extending longitudinally of the quill and at the base of which the quill is received, said slot opening into a first end face of said sleeve and having a width at least approximately equal to the outer diameter of the helix to be formed, and means for securing a length of wire stationary with respect to the quill and in such position that it lies in said groove at said first sleeve-end and extends obliquely beyond the quill through said slot whereby as the sleeve is rotated on the quill in one direction the wire will be wound into said groove to form a helix, said slot extending radially through the wall of said said sleeve so that when the helix is unwound from the quill by rotation of the sleeve in the opposite direction the helix may be removed from the sleeve by radial movement through the slot.

2. Apparatus for forming a long-pitch helix from a length of resilient wire, comprising an elongated quill having an external helical groove substantially corresponding in base diameter to the internal diameter of the helix to be formed and in pitch to the pitch of said helix, means for stationarily supporting said quill with the quill projecting longitudinally of itself from said support, a sleeve surrounding the projecting portion of said quill, said sleeve having a longitudinal slot at the base of which the quill is received, means supporting said sleeve in a fixed axial position for rotation about the axis of the quill, said slot opening into a first end of the sleeve and extending therealong for a distance equal at least to the length of the helix to be formed, means for securing a length of wire in such a position that it lies in said groove at said first sleeve-end and extends obliquely beyond the quill through said slot whereby as the sleeve is rotated on the quill in one direction the wire will be wound into said groove to form a helix, said slot having a width at least approximately equal to the outer diameter of the helix to be formed and extending radially through the wall of the sleeve so that when the helix is unwound from the quill by rotation of the sleeve in the opposite direction the helix may be removed from the sleeve by radial movement through the slot.

3. Apparatus for simultaneously forming the end portions of a length of wire into coaxial, long-pitch helices, said apparatus comprising a support, a quill secured in said support and having end portions projecting oppositely therefrom, each of said projecting quill portions being provided with a helical groove, a sleeve surrounding each projecting quill portion and rotatable about the axis thereof, each of said sleeves having a slot extending longitudinally of the quill and at the base of which the quill is received, said slot opening into that end of the sleeve adjacent said support and having a width at least approximately equal to the helix to be formed, said support being adapted to receive the intermediate portion of a length of wire having end portions extending obliquely to project through the open ends of the slots in the sleeves and to lie in said grooves, whereby as the sleeves are rotated the oblique end portions of the wire will be engaged by walls of said slots and wound into said grooves.

4. Apparatus for forming a long-pitch helix from a length of resilient wire, comprising relatively rotatable, coaxial members, one of said members being an elongated quill having an external helical groove substantially corresponding in base diameter to the internal diameter of the helix to be formed and in pitch to the pitch of such helix, and means for supporting a length of wire with an intermediate portion received in said groove and with first and second end portions projecting in opposite lateral directions from the quill, said means including provisions for securing the first end portion of the wire in fixed position relative to the quill, the other of said two relatively rotatable members having a first longitudinally extending face adapted on relative rotation of the two members in one direction to engage the second end portion of the wire and wrap it into said groove to form a helix and a second longitudinally extending face adapted upon relative rotation in the opposite direction to engage said second end portion and unwrap the helix from the quill, said two faces being spaced apart by a distance at least approximately equal to the outer diameter of the helix whereby the unwrapped helix may move away from the quill between such faces.

5. Apparatus as set forth in claim 4 further characterized in that said first longitudinally extending face is tangent to said quill.

6. Apparatus as set forth in claim 1 with the addition of power operated means for rotating said sleeve alternatively in either direction.

7. Apparatus as set forth in claim 3 with the addition of power operated means for rotating each of said sleeves alternatively in either direction.

8. Apparatus for forming a long-pitch helix from a length of resilient wire, comprising relatively rotatable, coaxial inner and outer members, the inner member being an elongated quill having an external helical groove substantially corresponding in pitch to the pitch of the helix to be formed, and means for securing a length of wire in fixed position relative to said quill with one portion of the wire disposed in said groove and another portion projecting laterally from the quill, the outer of said two relatively rotatable members having a first longitudinally extending face adapted on relative rotation of the two members in one direction to engage the projecting wire-portion and wrap it into said groove to form a helix and a second longitudinally extending face adapted on relative rotation of the two members in the opposite direction to engage the projecting wire proportion and progressively unwrap the helix from the quill, the bottom of said groove being formed at predetermined intervals with flat spots whereby the helix formed will possess an elongated cross-sectional shape.

9. Apparatus as set forth in claim 8 characterized in that the axial interval between adjacent flat spots is somewhat more than one-half the pitch of the helical groove.

References Cited in the file of this patent

UNITED STATES PATENTS

| | | |
|---|---|---|
| 548,000 | Lloyd | Oct. 15, 1895 |
| 692,407 | Wright | Feb. 4, 1902 |
| 758,744 | Fisher | May 3, 1904 |
| 1,881,672 | Kirchner | Oct. 11, 1932 |
| 2,649,120 | November | July 2, 1948 |
| 2,737,212 | Huszar | Mar. 6, 1956 |
| 2,836,203 | Brook | May 27, 1958 |

FOREIGN PATENTS

| | | |
|---|---|---|
| 701,512 | Great Britain | Dec. 30, 1953 |